US012619060B2

(12) United States Patent
Themelis

(10) Patent No.: US 12,619,060 B2
(45) Date of Patent: May 5, 2026

(54) MICROSCOPE SYSTEM AND CORRESPONDING METHOD

(71) Applicant: LEICA INSTRUMENTS (SINGAPORE) PTE. LTD., Singapore (SG)

(72) Inventor: George Themelis, Singapore (SG)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 117 days.

(21) Appl. No.: 18/722,599

(22) PCT Filed: Dec. 21, 2022

(86) PCT No.: PCT/EP2022/087165
§ 371 (c)(1),
(2) Date: Jun. 21, 2024

(87) PCT Pub. No.: WO2023/118256
PCT Pub. Date: Jun. 29, 2023

(65) Prior Publication Data
US 2025/0060576 A1 Feb. 20, 2025

(30) Foreign Application Priority Data
Dec. 21, 2021 (DE) .......................... 102021134017.9

(51) Int. Cl.
*G02B 21/36* (2006.01)
*G02B 21/16* (2006.01)

(52) U.S. Cl.
CPC ........... *G02B 21/365* (2013.01); *G02B 21/16* (2013.01); *G02B 21/361* (2013.01)

(58) Field of Classification Search
CPC .... G02B 21/365; G02B 21/16; G02B 21/361; G02B 21/0012; G02B 5/005; G02B 21/367; G02B 27/1013; G02B 27/108
See application file for complete search history.

(56) References Cited

U.S. PATENT DOCUMENTS 8,749,636 B2 * 6/2014 Brown .................. G01J 3/2823
359/359
10,018,890 B2 * 7/2018 Toriumi ................... G03B 9/06
(Continued)

FOREIGN PATENT DOCUMENTS

DE 202013011877 U1 9/2014
EP 3285116 A1 2/2018
(Continued)

OTHER PUBLICATIONS

Hagen Nathan et al: "Review of snapshot spectral imaging technologies", Optical Engineering, Soc. of Photo-Optical Instrumentation Engineers, Bellingham, vol. 52, No. 9, Sep. 1, 2013 (Sep. 1, 2013), p. 90901, XP060026022, ISSN: 0091-3286, DOI: 10.1117/1.0E.52.9.090901 [retrieved on Sep. 23, 2013] figure 6.

*Primary Examiner* — Tony Ko
(74) *Attorney, Agent, or Firm* — 2SPL Patent Attorneys PartG mbB; Yong Beom Hwang

(57) ABSTRACT

Examples relate to a microscope system, such as a surgical microscope system, and to a corresponding method. The microscope system (100) comprises a microscope (120) with a first optical imaging sensor (122) for generating first imaging sensor data based on light having a first wavelength spectrum, a second optical imaging sensor (124) for generating second imaging sensor data based on light having a second wavelength spectrum, and a multispectral iris (130), configured to provide an opening with a first numerical aperture for the light having the first wavelength spectrum and an opening with a second numerical aperture for the light having the second wavelength spectrum, with the first numerical aperture being different from the second numerical aperture. The microscope system comprises one or more processors (114), configured to generate a composite image
(Continued)

based on the first imaging sensor data and based on the second imaging sensor data.

17 Claims, 5 Drawing Sheets

(56)                     References Cited

U.S. PATENT DOCUMENTS

| | | | |
|---|---|---|---|
| 12,270,975 B2* | 4/2025 | Kikuchi | G02B 13/02 |
| 2010/0066854 A1 | 3/2010 | Mather et al. | |
| 2012/0008023 A1 | 1/2012 | Wajs | |
| 2014/0276008 A1* | 9/2014 | Steinbach | A61B 5/0059 |
| | | | 600/424 |
| 2017/0017135 A1 | 1/2017 | Toriumi | |
| 2017/0280029 A1* | 9/2017 | Steiner | G06T 11/001 |
| 2018/0052382 A1* | 2/2018 | Themelis | G02B 21/361 |
| 2020/0026055 A1 | 1/2020 | Li et al. | |
| 2022/0170793 A1* | 6/2022 | Scherer | G01J 3/0208 |
| 2025/0052988 A1* | 2/2025 | Sato | G02B 21/367 |
| 2025/0060576 A1* | 2/2025 | Themelis | G02B 21/365 |

FOREIGN PATENT DOCUMENTS

| | | | |
|---|---|---|---|
| EP | 3285116 B1 | 2/2018 | |
| EP | 3889886 A1 | 10/2021 | |

* cited by examiner

210

220

230

240

400

410

420

MICROSCOPE SYSTEM AND CORRESPONDING METHOD

TECHNICAL FIELD

Examples relate to a microscope system, such as a surgical microscope system, and to a corresponding method.

BACKGROUND

Microscopes, such as microscopes used in surgical microscope system, are optical systems that comprise various optical components. One optical component of a microscope is the iris, which is an adjustable opening that controls how much light reaches the oculars or the optical imaging sensor(s) of the microscope. The opening and closing of the iris influences the resolution and the depth of field of the image. If the opening of the iris is bigger, more light passes through the iris and reaches the oculars or the optical imaging sensor(s). This generally increases the resolution of the view or image, but decreases the depth of field, which is a distance interval, in which the view on the sample being viewed or captured appears sharp. If the opening of the iris is smaller, less light passes through. This increases the depth perception, but there is a decrease in resolution. Typically, surgical microscopes are set with a fixed iris at the "sweet spot" to have an acceptable balance in the inherent trade off.

In some surgical microscopes, a technology is used that allows to mitigate the tradeoff between the resolution and the depth of field. The principle is to utilize different iris sizes for left and right eyes on the optical eyepiece. As a result, the user sees two images (right/left) with different qualities, one with higher resolution and the other with higher depth of focus. The brain processes the information from both eyes the user perceives an image having both qualities, i.e., high resolution and large depth of field.

There may be a desire for further addressing the tradeoff between resolution and depth of field in microscopy.

SUMMARY

This desire is addressed by the subject-matter of the independent claims.

The concept proposed in the present disclosure is based on the finding that microscopes, and in particular microscopes being used as part of a surgical microscope system, can include multiple optical imaging sensors. For example, in surgical microscopes, separate optical imaging sensors may be used for reflectance imaging and fluorescence imaging. Moreover, the sensor being used for fluorescence imaging is often targeted at one or more fluorescence emission wavelength bands, i.e., a clearly defined subset of the spectrum. A so-called multi-spectral iris, e.g., as shown in European patent EP 3 285 116 B1, can be used to provide differently sized iris openings for two separate optical imaging sensors of the microscopes, by providing differently sized iris openings for two separate wavelength spectra being recorded by the respective optical imaging sensor. Image processing may then be used to combine the imaging sensor data of the two optical imaging sensors, to obtain a composite image that has the increased resolution obtained by the larger iris opening and the increased depth of field obtained by the smaller iris opening.

Various examples of the present disclosure relate to a microscope system, such as a surgical microscope system, comprising a microscope and one or more processors. The microscope comprises a first optical imaging sensor for generating first imaging sensor data based on light having a first wavelength spectrum. The microscope further comprises a second optical imaging sensor for generating second imaging sensor data based on light having a second wavelength spectrum. The microscope further comprises a multispectral iris, configured to provide an opening with a first numerical aperture for the light having the first wavelength spectrum and an opening with a second numerical aperture for the light having the second wavelength spectrum. The first numerical aperture is different from the second numerical aperture. The one or more processors are configured to generate a composite image based on the first imaging sensor data and based on the second imaging sensor data. By employing a multispectral sensor, differently sized iris openings may be provided in different wavelength spectra. By using two separate optical imaging sensors for sensing light in the different spectra, two sets of imaging sensor data may be generated-one with increased resolution, and the other with increased depth of field. These two sets of imaging sensor data may then be combined in the composite image to yield a composite image with both increased resolution and increased depth perception.

In microscopy, and in particular in surgical microscopy, different optical imaging sensors are used for reflectance imaging and for fluorescence imaging. This inherent separation may be used to implement the proposed concept. For example, the first wavelength spectrum may be suitable for performing reflectance imaging and the second wavelength spectrum may be suitable for performing fluorescence imaging. Alternatively, both the first and second optical imaging sensors may be used for reflectance or for fluorescence imaging. In other words, the first wavelength spectrum and the second wavelength spectrum may be suitable for performing reflectance imaging, or the first wavelength spectrum and the second wavelength spectrum may be suitable for performing fluorescence imaging.

In various examples, the first numerical aperture is larger than the second numerical aperture. Accordingly, the first imaging sensor data may include imaging sensor data with a higher resolution, while the second imaging sensor data may include imaging sensor data covering a larger depth of field. In the present application, the term "resolution" does not refer to the amount or density of pixels, but to the optical resolution, which is generally measured in line pairs per millimeter.

The first and second imaging sensor data are combined in the composite image, e.g., to use both the increased resolution and the increased depth of field of the respective imaging sensor data. Both the increased resolution and the increased depth of field may manifest themselves in term of increased image sharpness, with the increased resolution yielding increased image sharpness where the respective image is in focus, and the increased depth of field yielding increased image sharpness in regions where the higher-resolution image is out of focus. For example, the one or more processors may be configured to determine one or more portions of the first imaging sensor data having a higher image sharpness than one or more corresponding portions of the second imaging sensor data. The one or more processors may be configured to generate the composite image with the one or more portions of the first imaging sensor data having the higher image sharpness, with the remainder of the composite image being based on the second imaging sensor data. In other words, from the first imaging sensor data, which may be based on the larger iris opening, and which may thus yield the higher resolution where in focus, the higher-resolution sharp portions may be selected, with the remainder of the image being based on the (lower-resolution, but larger depth of field) second imaging sensor data.

To determine the portions of the respective imaging sensor data that are sharp, different techniques may be used. For example, the one or more processors may be configured to determine the one or more portions of the first imaging sensor data having a higher image sharpness than the one or more corresponding portions of the second imaging sensor data based on a contrast and/or based on a presence of spatial frequencies above a pre-defined spatial frequency threshold in the respective one or more portions.

In some examples, a grid-based approach may be used for determining the sharpness and combining the two sets of imaging sensor data. For example, the one or more processors may be configured to subdivide the first and second imaging sensor data into two-dimensional grids of blocks of pixels, with each block of pixels comprising a plurality of pixels. The one or more processors may be configured to determine the one or more portions of the first imaging sensor data having a higher image sharpness than corresponding one or more corresponding portions of the second imaging sensor data on a per-block of pixels basis. For example, on a per-block of pixels basis, the respective block of pixels may be selected from one of the sets of imaging sensor data and used for the composite image.

In another approach (or in addition to the afore-mentioned approach), the two sets of imaging sensor data may be merged on another level—by using the color information and spatial features from one of the sets of imaging sensor data (e.g., from the first imaging sensor data), and by using (only) the spatial features from the other set of imaging sensor data (e.g., from the second imaging sensor data). For example, the one or more processors may be configured to extract spatial features of the second imaging sensor data. The one or more processor may be configured to merge the spatial features from the second imaging sensor data with spatial features and color information of the first imaging sensor data to generate the composite image. This is particularly application if the second optical imaging sensor is generally used for fluorescence imaging, since the wavelength spectrum sensed by a fluorescence sensor is limited, rendering the color information included in the second imaging sensor data of such a fluorescence sensor less useful than the color information included in the first imaging sensor data.

Such a separation of color information and spatial features may be provided by converting the respective imaging sensor data into the HSB (Hue Saturation Brightness) color representation. For example, the one or more processors may be configured to process the first and second imaging sensor data in the hue, saturation, and brightness color representation. The one or more processors may be configured to merge a saturation component and a brightness component of the second imaging sensor data with a hue component, a saturation component, and a brightness component of the first imaging sensor data. For example, the hue component may comprise the color information, and the saturation and brightness component may represent the spatial features.

In the proposed concept, two separate optical imaging sensors are used to provide the respective imaging sensor data. The frames of the respective imaging sensor data may be time-synchronized, such that, at a given time, a frame of the first imaging sensor data can be combined with a frame of the second imaging sensor data that is taken at the same time. Accordingly, the one or more processors may be configured to generate the composite image based on frames of the first and second imaging sensor data that are taken at the same time. As a result, the frame rate and synchronization of the two sets of imaging sensor data might not be impacted by the proposed concept.

Microscope systems, and in particular surgical microscope systems, generally comprise an illumination system that is used to illuminate the object (i.e., sample) being imaged. Accordingly, the microscope system may comprise an illumination system, configured to illuminate an object to be imaged using the microscope system. An emission wavelength spectrum of the illumination system may comprise the first and the second wavelength spectrum. For example, the first wavelength spectrum may comprise a first wavelength band that is omitted from the second wavelength spectrum and the second wavelength spectrum may comprise a second wavelength band that is omitted from the first wavelength spectrum. The emission spectrum of the illumination system may comprise the first and the second wavelength band. In effect, suitable illumination may be provided for generating the first and second imaging sensor data at the same time.

The proposed concept uses a multispectral iris, which is an iris that has different numerical apertures in different wavelength bands. In various examples, such an iris may be implemented using bandpass filters that impact the perceived iris opening in one of the wavelength bands (but not the other). For example, the multispectral iris may comprise at least one bandpass filtering component configured to block the second wavelength spectrum.

In some examples, the microscope may operate with one or more fixed-aperture multispectral irises. For example, the microscope may comprise a single multispectral iris with a fixed numerical apertures or a filter wheel with a plurality of multispectral irises with fixed numerical apertures.

Alternatively, the first and/or second numerical apertures may be adjustable via a motor and movable components. For example, the multispectral iris may comprise a (first) plurality of bandpass filtering components configured to block the second wavelength spectrum. The microscope may comprise a motor for adjusting a positioning of the plurality of bandpass filtering components relative to each other. The one or more processors may be configured to control the motor of the microscope system to adjust the position of the plurality of bandpass filtering components relative to each other, thereby adjusting the second numerical aperture. For example, the plurality of bandpass filtering components may form a diaphragm, or the plurality of bandpass filtering components may correspond to two L-shaped bandpass filtering components. For example, the plurality of bandpass filtering component, which may be transparent (i.e., non-blocking) to the first wavelength spectrum, and which may thus be used without affecting the first numerical aperture, may be used to adjust the second numerical aperture.

To adjust the (larger) first numerical aperture, a second set of components may be used that blocks light in both wavelength spectra. For example, the multispectral iris may comprise a second plurality of components configured to block the first and second wavelength spectrum. The microscope may comprise a second motor for adjusting a positioning of the second plurality of components relative to each other. The one or more processors may be configured to control the second motor to adjust the position of the second plurality of components relative to each other, thereby adjusting the first numerical aperture. Accordingly, two sets of components may be used to control the first and second numerical aperture. Similarly, the second plurality of components may form a diaphragm, or the second plurality of components may correspond to two L-shaped bandpass filtering components.

For example, the one or more processors may be configured to control at least one motor of the microscope system to cause the motor to adjust at least one of the first and the second numerical aperture. For example, the at least one motor may be used to adjust the sets of components, or to turn the filter wheel.

Various examples of the present disclosure relate to a corresponding method for a microscope system. The method comprises providing, by a multispectral iris, an opening with a first numerical aperture for light having the first wavelength spectrum and an opening with a second numerical aperture for light having the second wavelength spectrum. The first numerical aperture is different from the second numerical aperture. The method comprises generating, by a first optical imaging sensor, first imaging sensor data based on the light having the first wavelength spectrum. The method comprises generating, by a second optical imaging sensor, second imaging sensor data based on the light having the second wavelength spectrum. The method comprises generating a composite image based on the first imaging sensor data and based on the second imaging sensor data.

SHORT DESCRIPTION OF THE FIGURES

Some examples of apparatuses and/or methods will be described in the following by way of example only, and with reference to the accompanying figures, in which FIG. 1a shows a schematic diagram of an example of a microscope system;

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
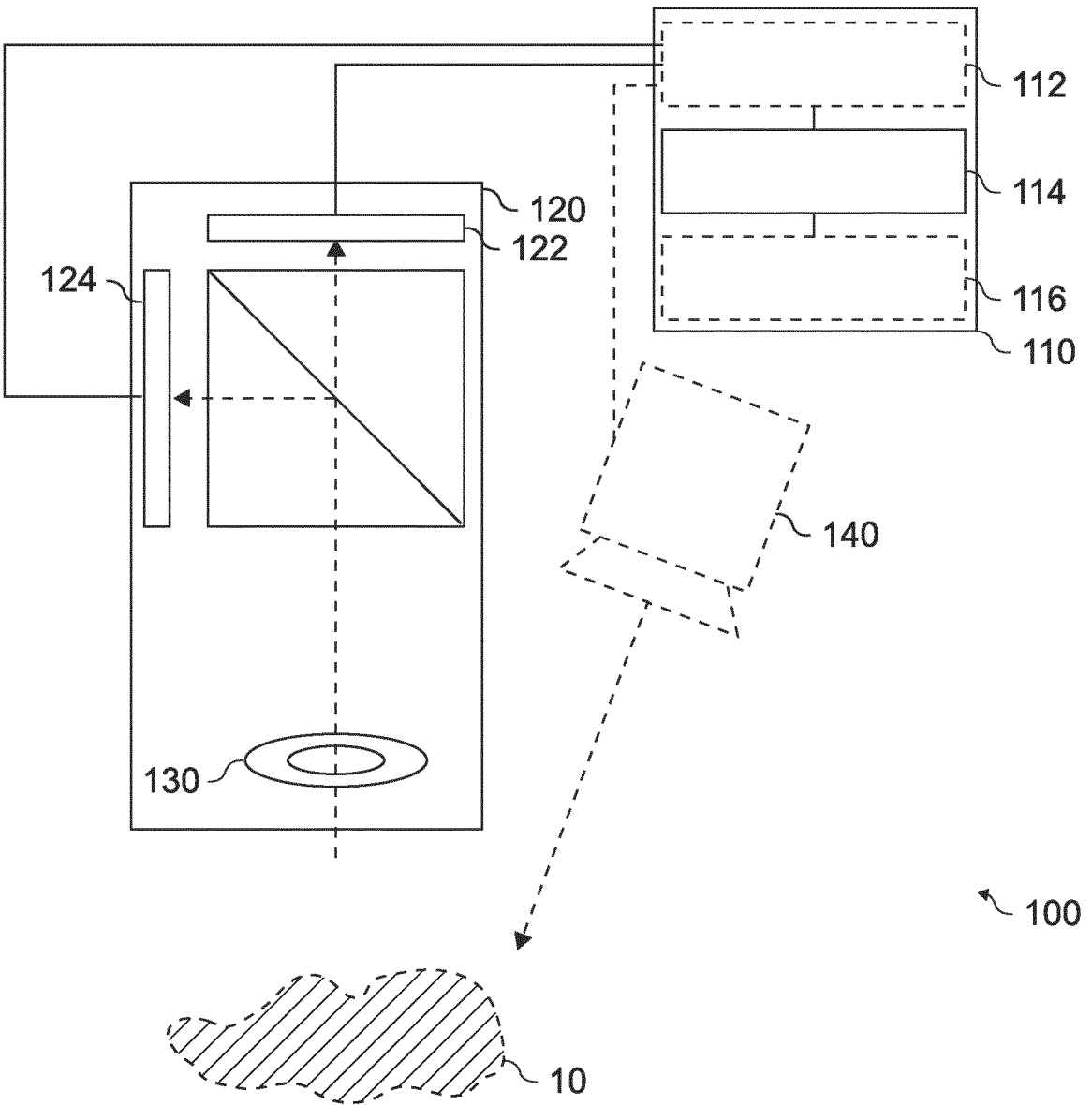
FIG. 1b shows a schematic diagram of an example of a surgical microscope system.
FIGS. 1c to 1f show schematic diagram of examples of multispectral irises.

FIG. 1a shows a schematic diagram of an example of a microscope system 100. The microscope system 100 comprises a microscope 120 with a first optical imaging sensor 122 for generating first imaging sensor data based on light having a first wavelength spectrum, and with a second optical imaging sensor 124 for generating second imaging sensor data based on light having a second wavelength spectrum. The microscope system 100 further comprises a multispectral iris 130, configured to provide an opening with a first numerical aperture for the light having the first wavelength spectrum and an opening with a second numerical aperture for the light having the second wavelength spectrum. The first numerical aperture is different from the second numerical aperture. Optionally, the microscope system 100 further comprises an illumination system 140, configured to illuminate an object 10 to be imaged using the microscope system 100.

Figure 1B:
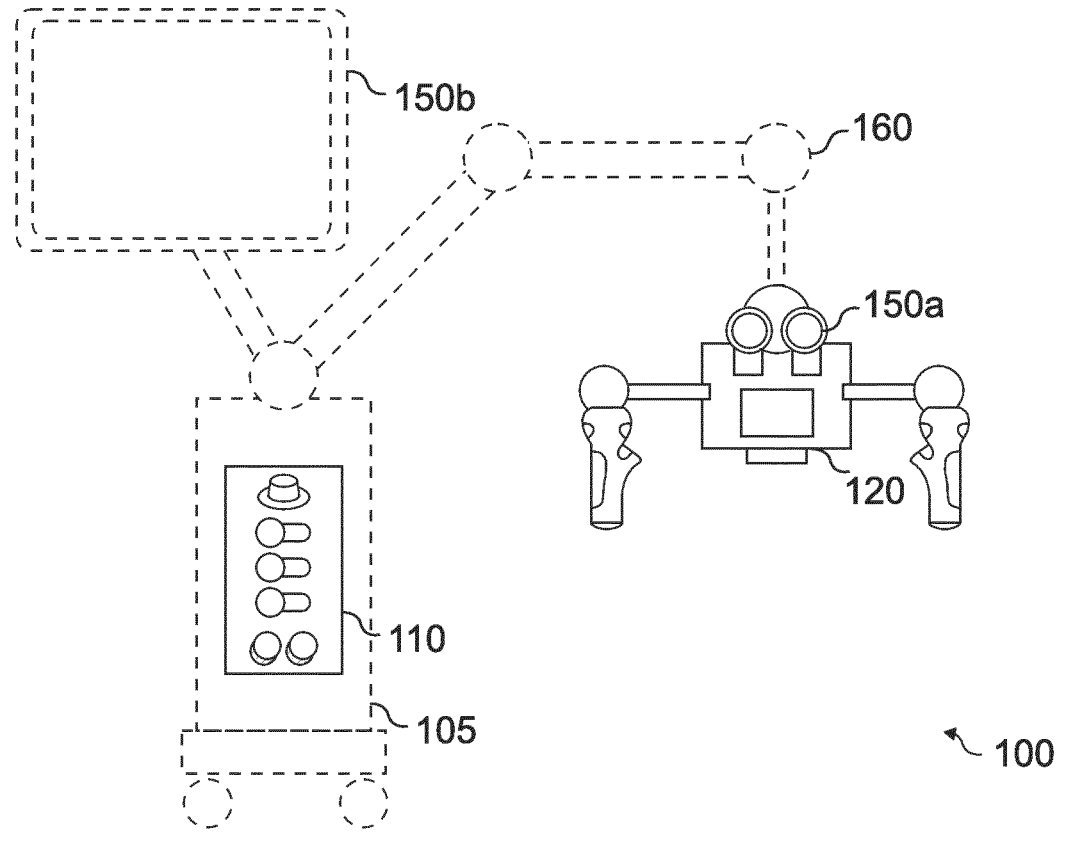

The optical imaging sensors 122; 124 and the iris 130 are part of the microscope 120 of the (surgical) microscope system 100 as shown in FIGS. 1a and 1b. In general, a microscope, such as the microscope 120, is an optical instrument that is suitable for examining objects that are too small to be examined by the human eye (alone). For example, a microscope may provide an optical magnification of a sample, such as the sample 10 shown in FIGS. 1a, 1b and 3. In modern microscopes, the optical magnification is often provided for a camera or an imaging sensor, such as the optical imaging sensors 122; 124 of the microscope 120. The microscope 120 may further comprise one or more optical magnification components that are used to magnify a view on the sample, such as an objective (i.e., lens).

Beside the optical components, such as the microscope 120 with the optical imaging sensors 122; 124, the iris 130 and the (optional) illumination system, the microscope system further comprises a computer system with one or more processors 114, which are configured to perform image processing within the microscope system 100 and/or to control the microscope system 100. For example, as shown in FIGS. 1a and 1b, the one or more processors 114 may be part of a (computer) system 110, which may further comprise one or more interfaces 112 and/or one or more storage devices 116, which are coupled to the one or more processors 114. In general, the functionality of the system is provided by the one or more processors, in conjunction with the one or more interfaces (for exchanging information, e.g., with the optical imaging sensors 122; 124 of the microscope, with the multispectral iris 130, or with a display device of the surgical microscope system) and/or with the one or more storage devices (for storing and/or retrieving information). The one or more processors 114, or more generally the system 100, is configured to generate a composite image based on the first imaging sensor data and based on the second imaging sensor data.

In general, a microscope system is a system that comprises a microscope 120 and additional components, which are operated together with the microscope. In other words, a microscope system is a system that comprises the microscope and one or more additional components, such as the system 110 (which is a computer system being adapted to control and, for example, process imaging sensor data of the microscope), the illumination system 140 (which is used to illuminate an object being imaged by the microscope), additional sensors, displays etc.

There are a variety of different types of microscopes. If the microscope is used in the medical or biological fields, the object 10 being viewed through the microscope may be a sample of organic tissue, e.g., arranged within a petri dish or present in a part of a body of a patient. For example, the microscope 120 may be a microscope of a surgical microscope system, i.e., a microscope that is to be used during a surgical procedure, such as an oncological surgical procedure or during tumor surgery. Accordingly, the object being viewed through the microscope, and shown in the composite image, may be a sample of organic tissue of a patient, and may be in particular be the surgical site that the surgeon operates on during the surgical procedure.

FIG. 1b shows a schematic diagram of an example of a surgical microscope system 100 comprising the system 110 and the microscope 120 (with the optical imaging sensors and the multispectral iris). The surgical microscope system 100 shown in FIG. 1b comprises a number of optional components, such as a base unit 105 (comprising the system 110) with a (rolling) stand, ocular displays 150a that are arranged at the microscope 120, an auxiliary display 150b that is arranged at the base unit 105, and a (robotic or manual) arm 160 which holds the microscope 120 in place, and which is coupled to the base unit 105 and to the microscope 120. In general, these optional and non-optional components may be coupled to the system 110, and thus the one or more processors 114, which may be configured to control and/or interact with the respective components.

The focus of the proposed concept is on three components—the multispectral iris, which yields different numerical apertures in (exactly) two different wavelength spectra, the optical imaging sensors, which are used to sense light in the two different wavelength spectra, and the one or more processors (e.g., the system), which are configured to generate the composite image based on the light sensed in the two different wavelength spectra.

The proposed system is built around the multispectral iris 130, which is, in combination with the definition of the two wavelength spectra, used to provide different numerical apertures for the two optical imaging sensors. While some approaches exist, where microscope systems comprise separate irises for the different optical imaging sensors, i.e., light passing through a first iris is directed (only) towards a first sensor and light passing through a second iris is directed (only) towards a first sensor, in the present case, the light passing through the multi-spectral iris is directed towards both optical imaging sensors. In other words, the light arriving at the first and second optical imaging sensor passes through the same iris. However, due to the optical properties of the multispectral iris, the numerical aperture perceived by the different wavelength spectra is different. For example, the light that arrives at the two optical imaging sensors may also pass through the same objective and may use the same focusing system.

In general terms, the multispectral iris 130 is configured to provide an opening with a first numerical aperture for the light having the first wavelength spectrum and an opening with a second numerical aperture for the light having the second wavelength spectrum. The first numerical aperture of the opening for the light having the first wavelength spectrum is different from the second numerical aperture of the opening for the light having the second wavelength spectrum. Consequently, the size of the opening, as perceived by the light of the respective spectrum is different. This can be achieved by using components that block one of the spectra but lets the other wavelength spectrum through. In other words, this can be achieved by one or more bandpass filters, which are configured to block one of the spectra. In the following, it is assumed that the first numerical aperture is larger than the second numerical aperture. Accordingly, the multispectral iris may comprise at least one bandpass filtering component (i.e., at least one optical bandpass filter) configured to block the second wavelength spectrum. On the other hand, the at least one bandpass filtering component might not block the first wavelength spectrum, i.e., the first wavelength spectrum may pass through the at least one bandpass filtering component. As a consequence, the opening perceived by the second wavelength spectrum may be smaller than the opening perceived by the first wavelength spectrum (as the at least one bandpass filtering component limits the size of the opening for the second wavelength spectrum).

Figure 1C:
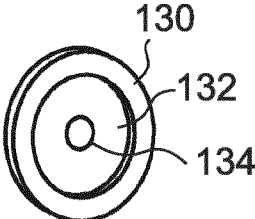

FIGS. 1c to 1f show schematic diagram of examples of multispectral irises. In a basic example, as shown in FIG. 1c, the multispectral iris may provide two fixed numerical apertures for the two different wavelength spectra. The multispectral iris 130 shown in FIG. 1c comprises two components, a bandpass filtering component 132 (which is configured to block the second wavelength spectrum, and an opening 134. The bandpass filtering component 132 has a fixed size and is encompassed by a rim. In FIG. 1c, the first numerical aperture is defined by the size of the bandpass filtering component 132 (as delineated by the rim), and the second numerical aperture is defined by the size of the opening 134.

Figure 1D:
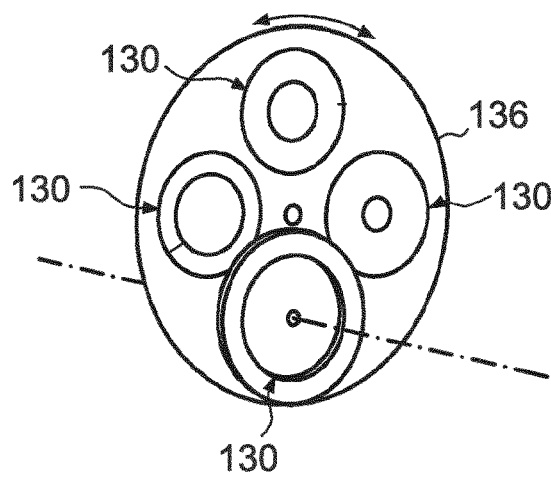

In some examples, it may be desirable to change the first and/or second numerical aperture. When using an iris with a fixed numerical aperture, this may be done by exchanging the iris with another iris, e.g., via a filter wheel. In other words, the microscope may comprise a filter wheel (or iris wheel) with a plurality of multispectral irises with fixed numerical apertures. An example for this is shown in FIG. 1d, where the filter wheel 136 comprises four multispectral irises 130, with different first and/or second numerical apertures.

In general, the filter wheel may be rotated manually. However, to enable automatic control of the numerical apertures by the system, the filter wheel may be operated via a servo motor included in the microscope, with the servo motor being used to rotate the filter wheel into a suitable position. The one or more processors (e.g., the system) may be configured to control at least one motor of the microscope system to cause the motor to adjust at least one of the first and the second numerical aperture, e.g., by rotating the filter wheel.

However, the application of motors inside the microscope is not limited to turning a filter wheel. Instead, a motor may be used to adjust a position of multiple (bandpass filtering) components relative to each other, in order to adjust the second or first numerical aperture.

Figure 1E:
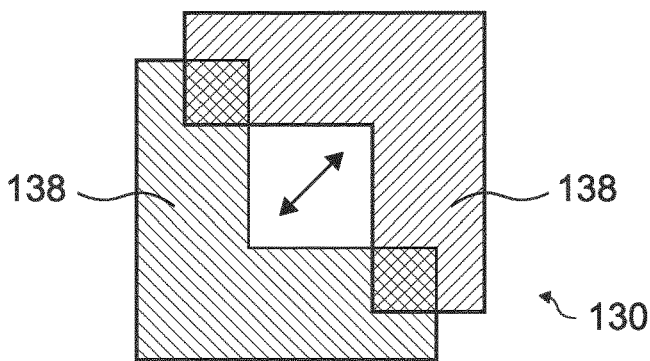
Figure 1F:
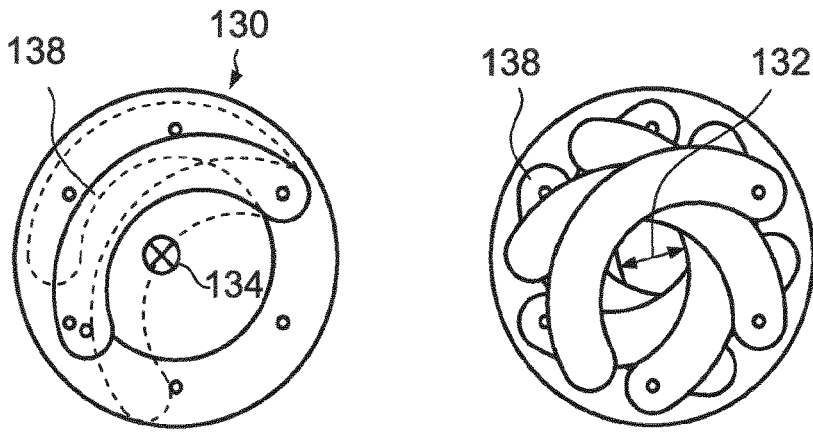

For example, as shown in FIGS. 1e and 1f, the multispectral iris may comprise a plurality of components 138 and a motor for adjusting a positioning of the components 138. The components 138 shown in FIGS. 1e and 1f may be bandpass-filtering components 138, configured to (only) block light of the second wavelength spectrum, or components 138 that are configured to block light of both the first and the second wavelength spectrum (e.g., made of metal or non-transparent plastic). In the former case, the components may be used to adjust the second numerical aperture (with the first numerical aperture being unaffected due to light in the first wavelength spectrum passing through the bandpass filtering components). In the latter case, the components may be used to adjust the first numerical aperture (with the second numerical aperture being even smaller than the first numerical aperture and therefore unaffected). For example, two such irises may be combined to form the multispectral iris (with the light arriving at the optical imaging sensor sequentially passing through both irises). For example, a first iris comprising a plurality of components being configured to block light in both the first and second wavelength spectrum and a second iris comprising a plurality of bandpass filtering components being configured to (only) block light in the second wavelength spectrum (but not light of the first wavelength spectrum) may be arranged in the light path between the object and both of the optical imaging sensor, e.g., between the object and a beam splitter/dichroic mirror being configured to split off a portion of the light to be directed towards one of the optical imaging sensors (with the light passing through the beam splitter/dichroic mirror being directed towards the other optical imaging sensor).

The multispectral iris (e.g., the second iris of the multispectral iris) may comprise a (first) plurality of bandpass filtering components configured to block the second wavelength spectrum. The microscope may comprise a motor for adjusting a positioning of the (first) plurality of bandpass filtering components relative to each other. The one or more processors (e.g., the system) may be configured to control the motor of the microscope system to adjust the position of the (first) plurality of bandpass filtering components relative to each other, thereby adjusting the second numerical aperture. Similarly, the multispectral iris (e.g., the first iris of the multispectral iris may comprise a second plurality of components configured to block the first and second wavelength spectrum. The microscope may a second motor for adjusting a positioning of the second plurality of components relative to each other. The one or more processors (e.g., the system) may be configured to control the second motor to adjust the position of the second plurality of components relative to each other, thereby adjusting the first numerical aperture.

In the examples shown in FIGS. 1e and 1f, a position of the first and/or second plurality of components 138 is adjusted relative to each other to adjust the respective numerical aperture. In effect, the size of an opening formed by the respective (bandpass filtering) components is adjusted by moving the respective (bandpass filtering) components relative to each other, thereby adjusting the respective numerical aperture. For example, as shown in FIG. 1e, the respective (bandpass filtering) components may correspond to two L-shaped components (e.g., two L-shaped components for blocking both the first and second wavelength spectrum or two bandpass filtering components) 138. By moving the two L-shaped components towards a common center of gravity, the opening formed by the two L-shaped components becomes smaller, resulting in a smaller numerical aperture. By moving the two L-shaped components away from the common center of gravity, the opening formed by the two L-shaped components becomes larger, resulting in a larger numerical aperture.

Alternatively, as shown in FIG. 1f, the respective (bandpass filtering) components 138 may form a diaphragm. The components 138 may be rotated inwards, thus decreasing the size of the opening 132 (resulting in a smaller numerical aperture) or outwards, thus increasing the size of the opening 132.

The components 138 in FIG. 1f are used to adjust the first numerical aperture, with the second numerical aperture being fixed according to the size of the opening 134 in the bandpass filter. The same principle can be applied in FIG. 1e, e.g., by combining a bandpass filter with a fixed-size opening with the two L-shaped components of FIG. 1e. Alternatively, in both cases, instead of using a bandpass filter with a fixed-size opening, the (first) plurality of bandpass filtering components may be used to form an adjustable iris opening for the second wavelength spectrum.

As outlined above, the (surgical) microscope system may comprise an illumination system 140, configured to illuminate an object to be imaged using the microscope system. Since both the first and the second wavelength spectrum are recorded using the respective sensors, the illumination system may emit light across both wavelength spectra. In other words, an emission wavelength spectrum of the illumination system may comprise the (e.g., at least partially or entirely cover the) first and the second wavelength spectrum. For example, the first wavelength spectrum may comprise a first wavelength band that is omitted from the second wavelength spectrum, the second wavelength spectrum comprises a second wavelength band that is omitted from the first wavelength spectrum, and the emission spectrum of the illumination system may comprise the first and the second wavelength band.

In the proposed microscope system, the first and second optical imaging sensors are used to sense (and measure) the light in the respective wavelength spectra. In particular, the first optical imaging sensor 122 is configured to generate the first imaging sensor data based on the light having the first wavelength spectrum, and the second optical imaging sensor 124 is configured to generate the first imaging sensor data based on the light having the second wavelength spectrum. In the proposed concept, the multispectral iris is used to pass light with different effective numerical apertures towards the sensors. To avoid a sensor sensing light with two (overly) different numerical apertures, the first and second wavelength bands may be mutually different, e.g., non-overlapping. However, the optical imaging sensor might not be limited to either wavelength band. For example, the first optical imaging sensor may be configured to sense the light having the first wavelength spectrum, and, optionally, at least a portion of the light having the second wavelength spectrum. Similarly, the second optical imaging sensor may be configured to sense the light having the second wavelength spectrum, and optionally, at least a portion of the light having the first wavelength spectrum. If an optical imaging sensor senses light in the respective "other" wavelength spectrum, its impact may be removed computationally from the respective imaging sensor data (e.g., by the system/the one or more processors). For example, the one or more processors (e.g., the system) may be configured to remove a portion of the first imaging sensor data being based on light having the second wavelength spectrum from the first imaging sensor data. Similarly, the one or more processors (e.g., the system) may be configured to remove a portion of the second imaging sensor data being based on light having the first wavelength spectrum from the second imaging sensor data.

This is particularly relevant if the proposed concept is applied in a surgical microscope system. For example, in a surgical microscope system, the first optical imaging sensor may, in general, be used for reflectance imaging and the second optical imaging sensor may be used for fluorescence imaging. In fluorescence imaging, light having a wavelength that coincides with a fluorescence excitation wavelength band of a fluorophore is emitted towards the object being viewed through the microscope. The fluorophore, which may be a chemical agent that is injected into blood vessels or tissue of a patent, is excited by the light in the fluorescence excitation wavelength band, and emits light in a fluorescence emission wavelength band, which is then sensed by the at least one optical imaging sensor being used for fluorescence imaging. In many cases, surgical microscope systems support a limited selection of fluorophores, with the optical imaging sensor or sensors being used for fluorescence imaging being tuned to the fluorescence emission wavelengths of the selection of fluorophores. During surgery, the reflectance image (showing the surgical site with "natural" colors) and the fluorescence image (as a pseudocolor overlay) may be combined in a further composite image, which can be viewed by the surgeon. Accordingly, the one or more processors (e.g., the system) may be configured may be generate the composite image in a first mode of operation (i.e., in a mode of operation being used for generating the composite image that is based both on a high resolution and a high depth of field image), and to generate a second composite image that is based on reflectance imaging and fluorescence imaging in a second mode of operation (in a combined reflectance and fluorescence imaging mode).

During reflectance imaging, the second optical imaging sensor may be otherwise unused. In the proposed concept, the optical imaging sensor usually being used for fluorescence imaging may be repurposed for recording the light in the second wavelength spectrum. Accordingly, the processing system may be configured to use the first optical imaging sensor to perform the reflectance imaging and to use the second optical imaging sensor to perform the fluorescence imaging in the second mode of operation. In other words, the first optical imaging sensor may generally be used for reflectance imaging in the microscope system, and the second optical imaging sensor may generally be used for fluorescence imaging in the microscope system. As a consequence, the second optical imaging sensor may be configured to sense, e.g., limited to sensing, a limited spectrum (i.e., the fluorescence emission wavelength bands), e.g., by a bandpass filter being arranged between the second optical imaging sensor and the object. Accordingly, the second wavelength spectrum may comprise, i.e., be based on or composed of, the fluorescence emission wavelength band(s) of one or more fluorophores. Accordingly, the first wavelength spectrum may be suitable for performing reflectance imaging and wherein the second wavelength spectrum is suitable for performing fluorescence imaging. In this case, the first wavelength spectrum may either exclude the fluorescence emission bands included in the second wavelength spectrum, or the first wavelength spectrum may include the fluorescence emission bands, with their impact being removed from the first imaging sensor data by the one or more processors (i.e., the system).

However, the proposed concept is also applicable in other scenarios, e.g., if both the first and second optical imaging sensor are suitable for performing and/or configured to perform reflectance imaging or if both the first and second optical imaging sensor are suitable for performing and/or configured to perform fluorescence imaging. Accordingly, the first wavelength spectrum and the second wavelength spectrum may be suitable for performing reflectance imaging. Alternatively, the first wavelength spectrum and the second wavelength spectrum may be suitable for performing fluorescence imaging. For example, a wavelength spectrum may be suitable for performing reflectance imaging if the wavelength spectrum covers at least 50% (or at least 60%, or at least 70%, or at least 80%) of the visible light spectrum. A wavelength spectrum may be suitable for performing fluorescence imaging if the wavelength spectrum is targeted at one or more fluorescence emission wavelength bands of one or more fluorophores.

The proposed concept is based on combining the first and second imaging sensor data in a way that uses both the higher resolution of the first imaging sensor data and the larger depth of field of the second imaging sensor data. In the following, a short introduction is given on the impact on the numerical apertures that are effective for the first and second wavelength bands, and thus the first and second imaging sensor data.

The resolving power of a microscope in the focal plane of the objective of the microscope is limited by the diffraction of the light, which is, in turn, determined by the numerical aperture of the microscope. In particular, the maximum resolving power, and thus resolution, is proportional to the numerical aperture. In effect, a high resolution depends on a high numerical aperture, which is obtained by increasing the size of the opening of the iris.

However, the numerical aperture has a major impact on the depth of field of the microscope, i.e., the sharpness of the portions of the object being imaged that lie outside the focal plane. A large numerical aperture results in a shallow depth of field, such that variations of the distance between the object being imaged and the objective and sensor of the microscope lead to more portions of the object appearing out of focus.

In the proposed concept, two sets of imaging sensor data are generated, one with a larger numerical aperture (i.e., the first imaging sensor data), resulting in an increased resolution (and a shallow depth of field), and one with a smaller numerical aperture (i.e., the second imaging sensor data), resulting in an increased depth of field (and lower resolution). Both sets of imaging sensor data may have the same field of view. The one or more processors (e.g., the system) are configured to combine these two sets of imaging sensor data in order to generate a composite image that has both the increased resolution (in portions of the image that are in focus in the first imaging sensor data) and the increased depth of field (to increase the portions of the image that appear sharp, based on the second imaging sensor data. In the following, two techniques are introduced for generating the composite image. Both techniques have in common that they preferably operate on synchronized imaging sensor data. In other words, the one or more processors (e.g., the system) may be configured to generate the composite image based on frames of the first and second imaging sensor data that are taken at the same time, i.e., that are time synchronized. In particular, the first and second imaging sensor data might not be taken successively (e.g., based on imaging sensor data being recorded with two different numerical aperture settings of an iris capable of quickly switching between two numerical aperture settings).

In the following, a first approach is introduced. In this approach, the two sets of imaging sensor data are analyzed to determine portions that appear sharper in one of the sets of imaging sensor data. In other words, the one or more processors (e.g., the system) may be configured to determine one or more portions of the first imaging sensor data having a higher image sharpness than one or more corresponding portions of the second imaging sensor data. In general, if a portion of the first imaging sensor data is in focus, i.e., in a depth of field around the focus plane of the first optical imaging sensor, it is capable of providing a higher image sharpness due to the higher resolution. However, since the depth of field of the first optical imaging sensor is more shallow than the depth of field of the second optical imaging sensor, more portions of the first imaging sensor data may be out of focus, leading to less sharpness of the respective portion of the first imaging sensor data. Accordingly, portions that appear sharper in the first imaging sensor data, i.e., portions that are in focus in the first imaging sensor data may be included in the composite image, with the remaining portions being taken from the second imaging sensor data. In other words, the one or more processors (e.g., the system) may be configured to generate the composite image with the one or more portions of the first imaging sensor data having the higher image sharpness, with the remainder of the composite image being based on the second imaging sensor data. In effect, the one or more processors (e.g., the system) may be configured to generate the composite image with the one or more portions of the first imaging sensor data having the higher image sharpness in the first imaging sensor data, and with one or more further portions of the second imaging sensor data having a higher sharpness in the second imaging sensor data.

For the comparison of the sharpness of the corresponding portions of the first and second imaging sensor data, the first and second imaging sensor data may be subdivided into grids of blocks of pixels, with corresponding blocks of pixels of the first and second imaging sensor data being based on corresponding portions of the field of view. Accordingly, the one or more processors (e.g., the system) may be configured to subdivide the first and second imaging sensor data into two-dimensional grids of blocks of pixels, with each block of pixels comprising a plurality of pixels. For example, the one or more processors (e.g., the system) may be configured to subdivide the first and second imaging sensor data into grids of m×n blocks of o×p pixels each, with m, n, o, p being positive integers ≥2. The one or more processors (e.g., the system) may be configured to determine the one or more portions of the first imaging sensor data having a higher image sharpness than corresponding one or more corresponding portions of the second imaging sensor data on a per-block of pixels basis. In other words, for each block of pixels of the grid, the one or more processors (e.g., the system) may be configured to compare the sharpness of the block of the first imaging sensor data with the sharpness of the corresponding block of the second imaging sensor data.

In the present disclosure, the image sharpness is evaluated to compare the respective portions of the first and second imaging sensor data. The sharpness of the different portions may be determined based on the contrast of the respective images and/or based on the proportion of high spatial frequencies in the respective images. For example, the one or more processors (e.g., the system) may be configured to determine the one or more portions of the first imaging sensor data having a higher image sharpness than the one or more corresponding portions of the second imaging sensor data based on a contrast and/or based on a presence of spatial frequencies above a pre-defined spatial frequency threshold in the respective one or more portions (e.g., blocks of pixels).

For example, the system may be configured to determine the contrast of the portions (e.g., blocks of pixels) of the respective imaging sensor data, e.g., by determining the ratio of the standard deviation and the mean value of the pixels of the image, or by doing kernel-based comparisons between individual pixels and their neighbors (i.e., adjacent pixels). The sharper a portion of an image appears, the higher the contrast of the image generally is.

The system may also be configured to determine the distribution of spatial frequencies of the respective portions (e.g., blocks of pixels) of the imaging sensor data, e.g., by performing a 2D Fourier transform of the two sets of imaging sensor data. The higher the proportion of high spatial frequencies in the respective portions of the imaging sensor data, the more fine-grained structures are visible in the portion of the imaging sensor data, which is the case if the respective portions of the image containing the fine-grained structures are perceived as sharp. By determining the integral of the portion of the distribution of the spatial frequencies above a pre-defined frequency, a quantitative measure can be determined that can be used to compare the presence of fine-grained structure across imaging sensor data, e.g., to compare the sharpness of two corresponding portions of a field of view in the first and second imaging sensor data.

In a second approach, which may be combined with the first approach, the two sets of imaging sensor data are merged. In particular, the spatial features of the second imaging sensor data are merged with the spatial features and color information of the first imaging sensor data. In other words, the one or more processors (e.g., the system) may be configured to extract spatial features of the second imaging sensor data, and to merge the spatial features from the second imaging sensor data with spatial features and color information of the first imaging sensor data to generate the composite image. The color information of the second imaging sensor data may be omitted, in particular if the second optical imaging sensor is generally used for fluorescence imaging and thus comprises limited color information. To combine this second approach with the first approach, the merging may be limited to the portions (i.e., blocks of pixels) of the second imaging sensor data that have a higher sharpness than the corresponding portions of the first imaging sensor data. Alternatively, the merging may be performed across the entire field if view.

To perform this merge, the first and second imaging sensor data may be converted into a different color representation known as HSB (Hue, Saturation, Brightness), HSV (Hue, Saturation, Value) or HSL (Hue, Saturation, Lightness). In general, HSB and HSV are two terms that are used for the same representation, and HSL is similar, with a maximal lightness in HSL being pure white in contrast to HSB/HSV, where the maximal value/brightness increases the intensity of colors. However, for the purposes of merging two sets of imaging sensor data, both HSB/HSB and HSL can be used. In the following, the term "hue, saturation, brightness" is used to mean any of HSB, HSV and HSL. The one or more processors (e.g., the system) may be configured to process the first and second imaging sensor data in a hue, saturation, and brightness color representation (e.g., into one of HSB/HSV or HSL). The one or more processors (e.g., the system) may be configured to merge a saturation component and a brightness/value or lightness component of the second imaging sensor data with a hue component, a saturation component and a brightness/value or lightness component of the first imaging sensor data. In this context, the merge can be performed by determining an average between the two components being merged (on a pixel-by-pixel basis) or by using a maximal value or minimal value of the two components being merged (on a pixel-by-pixel basis). After the merging, the imaging sensor data may be converted back into the original color representation. For example, the first and second imaging sensor data may be obtained as RGB (Red, Green, Blue) imaging sensor data from the optical imaging sensors, converted into the HSB/HSV or HSL color representation for merging, and converted back into the RGB color representation to obtain the composite image.

The composite image may be viewed by the user, e.g., the surgeon, of the microscope system. For this purpose, the composite image may be provided to the display, e.g., the auxiliary display 150b or the ocular displays 150a, of the microscope system. Accordingly, the processing system is configured to generate a display signal for a display device 150 of the microscope system, the display signal being based on the composite image. For example, the display signal may be a signal for driving (e.g., controlling) the display device 150. For example, the display signal may comprise video data and/or control instructions for driving the display. For example, the display signal may be provided via one of the one or more interfaces 112 of the system. Accordingly, the system 110 may comprise a video interface 112 that is suitable for providing the video signal to the display 150 of the microscope system 100.

In the proposed microscope system, optical imaging sensors are used to provide the first and second imaging sensor data. Accordingly, the first and second optical imaging sensors 122; 124 are configured to generate the first and second imaging sensor data, respectively. For example, the optical imaging sensors 122; 124 of the microscope 120 may comprise or be APS (Active Pixel Sensor)- or a CCD (Charge-Coupled-Device)-based imaging sensors 122; 124. For example, in APS-based imaging sensors, light is recorded at each pixel using a photodetector and an active amplifier of the pixel. APS-based imaging sensors are often based on CMOS (Complementary Metal-Oxide-Semiconductor) or S-CMOS (Scientific CMOS) technology. In CCD-based imaging sensors, incoming photons are converted into electron charges at a semiconductor-oxide interface, which are subsequently moved between capacitive bins in the imaging sensors by a circuitry of the imaging sensors to perform the imaging. The processing system 110 may be configured to obtain (i.e., receive or read out) the respective imaging sensor data from the respective optical imaging sensors. The respective imaging sensor data may be obtained by receiving the imaging sensor data from the respective optical imaging sensor (e.g., via the interface 112), by reading the respective imaging sensor data out from a memory of the respective optical imaging sensor (e.g., via the interface 112), or by reading the imaging sensor data from a storage device 116 of the system 110, e.g., after the imaging sensor data has been written to the storage device 116 by the respective optical imaging sensor or by another system or processor. As shown in FIGS. 1a, 1c, 3 and 4, the microscope may comprise a beam splitter for guiding the light reflected or emitted by the object towards the first and the second optical imaging sensor.

The one or more interfaces 112 of the system 110 may correspond to one or more inputs and/or outputs for receiving and/or transmitting information, which may be in digital (bit) values according to a specified code, within a module, between modules or between modules of different entities. For example, the one or more interfaces 112 may comprise interface circuitry configured to receive and/or transmit information. The one or more processors 114 of the system 110 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. The one or more storage devices 116 of the system 110 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

Figure 4:
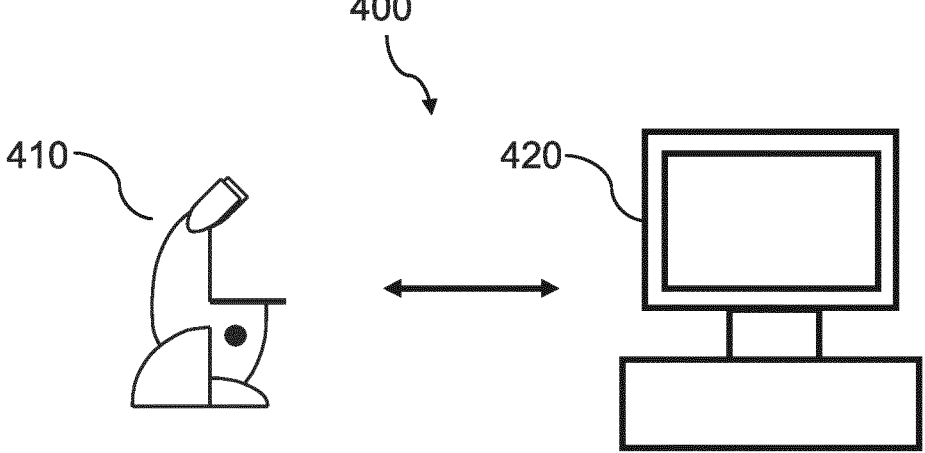
FIG. 4 shows a schematic diagram of an example of a system comprising a microscope and a computer system.

More details and aspects of the (surgical) microscope system are mentioned in connection with the proposed concept, or one or more examples described above or below (e.g., FIGS. 2 to 4). The (surgical) microscope system may comprise one or more additional optional features corresponding to one or more aspects of the proposed concept, or one or more examples described above or below.

Figure 2:
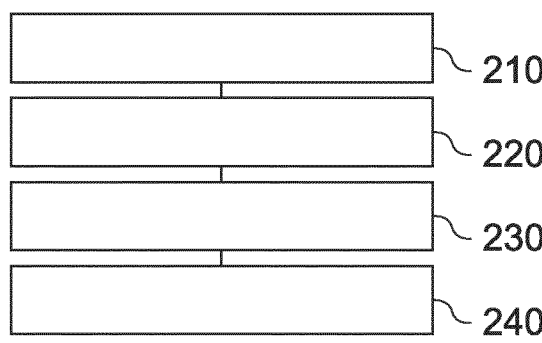
FIG. 2 shows a flow chart of an example of a method for a microscope system.

FIG. 2 shows a flow chart of a method for a microscope system. The method comprises providing 210, by a multispectral iris, an opening with a first numerical aperture for light having the first wavelength spectrum and an opening with a second numerical aperture for light having the second wavelength spectrum, with the first numerical aperture being different from the second numerical aperture. The method comprises generating 220, by a first optical imaging sensor, first imaging sensor data based on the light having the first wavelength spectrum. The method comprises generating 230, by a second optical imaging sensor, second imaging sensor data based on the light having the second wavelength spectrum. The method comprises generating 240 a composite image based on the first imaging sensor data and based on the second imaging sensor data.

For example, the method may be implemented by the microscope system introduced in connection with one of the FIGS. 1a to 1f. Features introduced in connection with the (surgical) microscope system of FIGS. 1a to 1f may likewise be included in the corresponding method.

More details and aspects of the method for the microscope system are mentioned in connection with the proposed concept or one or more examples described above or below (e.g., FIG. 1a to 1c, 3 and 4). The method for the microscope system may comprise one or more additional optional features corresponding to one or more aspects of the proposed concept, or one or more examples described above or below.

Various examples relate to a concept for a digital version of "fusion optics", i.e., the use of different numerical aperture settings at the same time, which is based on multispectral imaging, thereby providing a concept for digital fusion optics.

In the proposed concept, the "fusion optics" principle is transposed into digital imaging to create two-dimensional images (not stereo imaging) with both increased resolution and increased depth of field. In the proposed concept, the two images (i.e., the first and second imaging sensor data) are fused digitally into one image instead of relying on the human brain's visual perception. Instead of using at least two imaging sensors with two different irises, which would increase cost, complexity and size, the existing reflectance and fluorescence sensors may be combined with a multispectral iris to implement the proposed concept.

In particular, for multispectral imaging systems such as systems providing a pseudocolor overlay that is based on fluorescence emissions, multiple imaging sensors are employed, which may be reused for fusion optics imaging. In systems for providing the pseudocolor fluorescence overlay, each imaging channel (right/left) employs two sensors, one used for white light and the other for fluorescence imaging. In various examples of the proposed concept, the multispectral capabilities of such a system, or of any other multispectral system, may be used to create fusion optics images, by means of a multispectral iris. As outlined above, a multispectral iris, is a single element that behaves as closed iris for a part of the spectrum and as open for the rest of the spectrum. This would allow the two sensors of the multispectral imaging system to capture two images with different iris settings. In effect, the proposed concept combines the use of a multispectral iris with multispectral sensors to achieve fusion optics, combining resolution with depth of focus.

In some examples, the metal iris may be replaced with a filter that would allow some spectral bands (e.g., the first wavelength spectrum) to go through the entire filer and other bands (e.g., the second wavelength spectrum) may have a much smaller area to pass through. Both images may then be fused to produce the composite image.

Figure 3:
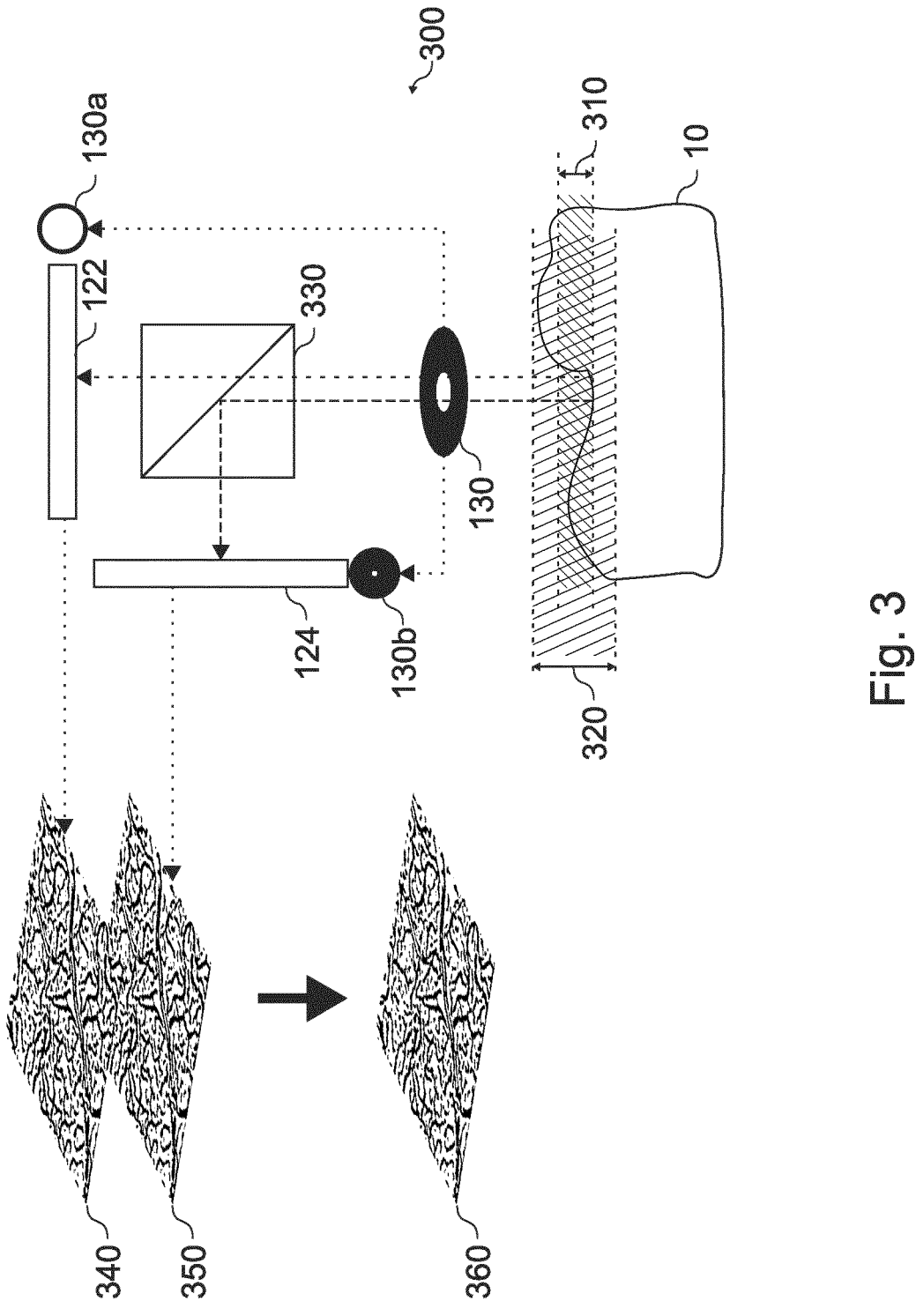
FIG. 3 shows a schematic diagram of an example of the digital fusion optics concept.

FIG. 3 shows a schematic diagram of the digital fusion optics concept. FIG. 3 shows a microscope system 300 and a sample 10. The microscope of the microscope system 300 comprises a first optical imaging sensor 122 (for generating first imaging sensor data with a high resolution), a second optical imaging sensor 124 (for generating second imaging sensor data with a larger depth of field), a multispectral iris 130 and a beam splitter 330. The multispectral iris has a first numerical aperture in a first wavelength band being sensed by the first optical imaging sensor 122, resulting in an effective iris 130a with a wider opening (and a corresponding more shallow depth of field 310), and a second numerical aperture in a second wavelength band being sensed by the second optical imaging sensor 124, resulting in an effective iris 130b with a more narrow opening (and a corresponding wider depth of field 320). The first imaging sensor data 340 (i.e., a higher resolution image of the more narrow depth of field 310) provided by the first optical imaging sensor is combined with the second imaging sensor data 350 (i.e., an image with a wider depth of field 320 at a lower resolution) of the second optical imaging sensor to generate a composite image 360 using real-time image fusion. The composite (i.e., fused) image has an increased depth of field and an increased resolution.

In some examples, the spectral sensitivity of both sensors may contain enough color rendering bands so that they can be calibrated to produce a proper color image. In some examples, where one sensor is tuned for white light reflectance, and the other for fluorescence imaging of the medically approved fluorophores (5-ALA, fluorescein, and ICG), the color content of the FL sensor might not be sufficient to create a proper color image. In that case, only the spatial features of the image provided by the fluorescence sensors may be extracted without the full color content and that information may be used to improve the spatial features of the other sensor which captures the colors.

The fusion of the two images can be done digitally. In a simple example, in both images, the local contrast may be measured, e.g., by measuring the high spatial frequencies, to identify the best-focused areas of each image. Then, for each image area, a selection may be made to take the area from the image with the higher contrast.

More details and aspects of the digital fusion concept are mentioned in connection with the proposed concept, or one or more examples described above or below (e.g., FIGS. 1a to 2, 4). The digital fusion concept may comprise one or more additional optional features corresponding to one or more aspects of the proposed concept, or one or more examples described above or below.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1 to 3. Alternatively, a microscope may be part of or connected to a system as described in connection with one or more of the FIGS. 1 to 3. FIG. 4 shows a schematic illustration of a system 400 configured to perform a method described herein. The system 400 comprises a microscope 410 and a computer system 420. The microscope 410 is configured to take images and is connected to the computer system 420. The computer system 420 is configured to execute at least a part of a method described herein. The computer system 420 may be configured to execute a machine learning algorithm. The computer system 420 and microscope 410 may be separate entities but can also be integrated together in one common housing. The computer system 420 may be part of a central processing system of the microscope 410 and/or the computer system 420 may be part of a subcomponent of the microscope 410, such as a sensor, an actor, a camera or an illumination unit, etc. of the microscope 410.

The computer system 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 420 may comprise any circuit or combination of circuits. In one embodiment, the computer system 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 420 may also include a display device, one or more speakers, and a keyboard and/or controller, which can include a mouse, trackball, touch screen, voice-recognition device, or any other device that permits a system user to input information into and receive information from the computer system 420.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS

10 Object
100 (Surgical) microscope system
110 System
105 Stand
112 One or more interfaces
114 One or more processors
116 One or more storage devices
120 Microscope
122 First optical imaging sensor
124 Second optical imaging sensor 130 Multispectral iris, iris
132 Bandpass filtering component
134 Opening
136 Filter wheel
138 Component
140 Illumination system
150a Ocular displays
150b Auxiliary display
160 Arm
210 Providing an opening with a first numerical aperture and an opening with a second numerical aperture
220 Generating first imaging sensor data
230 Generating second imaging sensor data
240 Generating a composite image
300 Microscope system
310, 320 Depth of field
330 Beam splitter
340 First imaging sensor data
350 Second imaging sensor data
360 Composite image
400 System
410 Microscope
420 Computer system

The invention claimed is:

1. A microscope system comprising:
a microscope comprising:
a first optical imaging sensor for generating first imaging sensor data based on light having a first wavelength spectrum,
a second optical imaging sensor for generating second imaging sensor data based on light having a second wavelength spectrum, and
a multispectral iris, configured to provide an opening with a first numerical aperture for the light having the first wavelength spectrum and an opening with a second numerical aperture for the light having the second wavelength spectrum, with the first numerical aperture being different from the second numerical aperture; and
one or more processors, configured to:
generate a composite image based on the first imaging sensor data and based on the second imaging sensor data.

2. The microscope system according to claim 1, wherein the first wavelength spectrum is suitable for performing reflectance imaging and wherein the second wavelength spectrum is suitable for performing fluorescence imaging, or wherein the first wavelength spectrum and the second wavelength spectrum are suitable for performing reflectance imaging, or wherein the first wavelength spectrum and the second wavelength spectrum are suitable for performing fluorescence imaging.

3. The microscope system according to claim 1, wherein the first numerical aperture is larger than the second numerical aperture.

4. The microscope system according to claim 3, wherein the one or more processors are configured to determine one or more portions of the first imaging sensor data having a higher image sharpness than one or more corresponding portions of the second imaging sensor data, and to generate the composite image with the one or more portions of the first imaging sensor data having the higher image sharpness, with the remainder of the composite image being based on the second imaging sensor data.

5. The microscope system according to claim 4, wherein the one or more processors are configured to determine the one or more portions of the first imaging sensor data having a higher image sharpness than the one or more corresponding portions of the second imaging sensor data based on a contrast and/or based on a presence of spatial frequencies above a pre-defined spatial frequency threshold in the respective one or more portions.

6. The microscope system according to claim 3, wherein the one or more processors are configured to subdivide the first and second imaging sensor data into two-dimensional grids of blocks of pixels, with each block of pixels comprising a plurality of pixels, and to determine the one or more portions of the first imaging sensor data having a higher image sharpness than corresponding one or more corresponding portions of the second imaging sensor data on a per-block of pixels basis.

7. The microscope system according to claim 1, wherein the one or more processors are configured to extract spatial features of the second imaging sensor data, and to merge the spatial features from the second imaging sensor data with spatial features and color information of the first imaging sensor data to generate the composite image.

8. The microscope system according to claim 7, wherein the one or more processors are configured to process the first and second imaging sensor data in a hue, saturation, and brightness color representation, and to merge a saturation component and a brightness component of the second imaging sensor data with a hue component, a saturation component, and a brightness component of the first imaging sensor data.

9. The microscope system according to claim 1, comprising an illumination system, configured to illuminate an object to be imaged using the microscope system, wherein an emission wavelength spectrum of the illumination system comprise the first and the second wavelength spectrum.

10. The microscope system according to claim 9, wherein the first wavelength spectrum comprises a first wavelength band that is omitted from the second wavelength spectrum, the second wavelength spectrum comprises a second wavelength band that is omitted from the first wavelength spectrum, and the emission spectrum of the illumination system comprises the first and the second wavelength band.

11. The microscope system according to claim 1, wherein the multispectral iris comprises at least one bandpass filtering component configured to block the second wavelength spectrum.

12. The microscope system according to claim 11, wherein the multispectral iris comprises a plurality of bandpass filtering components configured to block the second wavelength spectrum, and wherein the microscope comprises a motor for adjusting a positioning of the plurality of bandpass filtering components relative to each other, wherein the one or more processors are configured to control the motor of the microscope system to adjust the position of the plurality of bandpass filtering components relative to each other, thereby adjusting the second numerical aperture.

13. The microscope system according to claim 12, wherein the plurality of bandpass filtering components form a diaphragm,
    or wherein the plurality of bandpass filtering components correspond to two L-shaped bandpass filtering components.

14. The microscope system according to claim 11, wherein the multispectral iris comprises a second plurality of components configured to block the first and second wavelength spectrum and wherein the microscope comprises a second motor for adjusting a positioning of the second plurality of components relative to each other, wherein the one or more processors are configured to control the second motor to adjust the position of the second plurality of components relative to each other, thereby adjusting the first numerical aperture.

15. The microscope system according to claim 1, wherein the one or more processors are configured to control at least one motor of the microscope system to cause the motor to adjust at least one of the first and the second numerical aperture.

16. The microscope system according to claim 1, comprising a filter wheel with a plurality of multispectral irises with fixed numerical apertures.

17. A method for a microscope system, the method comprising:
    providing, by a multispectral iris, an opening with a first numerical aperture for light having the first wavelength spectrum and an opening with a second numerical aperture for light having the second wavelength spectrum, with the first numerical aperture being different from the second numerical aperture;
    generating, by a first optical imaging sensor, first imaging sensor data based on the light having the first wavelength spectrum;
    generating, by a second optical imaging sensor, second imaging sensor data based on the light having the second wavelength spectrum; and
    generating a composite image based on the first imaging sensor data and based on the second imaging sensor data.

* * * * *